Feb. 25, 1969          R. A. WOLFF          3,430,059
VOLTAGE REGULATOR CIRCUIT
Filed Oct. 22, 1965

INVENTOR.
Robert A. Wolff
BY
ATTY.

United States Patent Office 3,430,059
Patented Feb. 25, 1969

3,430,059
VOLTAGE REGULATOR CIRCUIT
Robert A. Wolff, Lombard, Ill., assignor to Admiral Corporation, Chicago, Ill., a corporation of Delaware
Filed Oct. 22, 1965, Ser. No. 502,131
U.S. Cl. 307—66                          8 Claims
Int. Cl. H02j 7/00, 9/00; H01m 45/04

ABSTRACT OF THE DISCLOSURE

A power supply with a rechargeable battery for delivering regulated power to a load and including an auxiliary power supply for energization of said load from an outside alternating current source. An interlocked plug arrangement is used to automatically disconnect the battery when operating from the external AC source. The voltage regulator automatically operates at two different voltage levels for supplying energy to the load and for recharging the battery from the AC source when the load is disconnected.

---

Figures 1, 2:
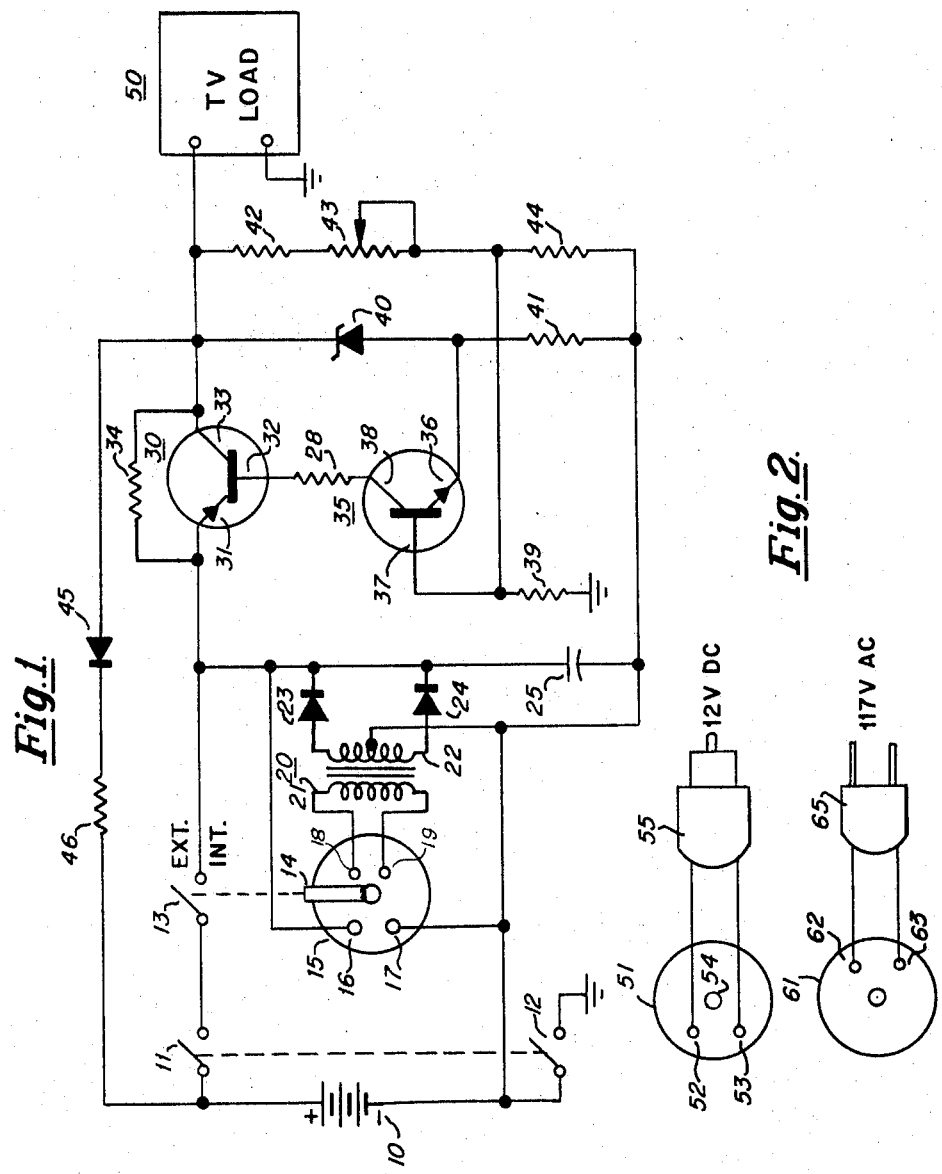

This invention relates in general to voltage regulators and in particular to voltage regulators utilized in electronic apparatus containing an internal rechargeable source of power as well as an external power connection.

Recently, the television viewing public has witnessed the introduction and acceptance of completely portable television receivers utilizing semi-conductor circuitry and self-contained rechargeable batteries. Since most television receivers are used in the home for a great percentage of time, it is desirable to include an external power source connection to preserve the useful life of the rechargeable battery when the receiver is not being used as a "portable."

It is well known that batteries age with consequent deterioration in their power capabilities and output voltages. Without corrective measures, serious disturbances as well as circuit malfunctions in the television receiver would result. Consequently, it has proven expedient to provide some type of regulation device between the battery and the television load to assure a relatively constant voltage for the television set under all conditions encountered during normal battery life.

Those skilled in the art will also recognize that rechargeable batteries should be recharged under somewhat exacting conditions to provide optimum service life. In general, the charge voltage for the battery is substantially higher than its terminal voltage and must be maintained within relatively narrow limits to provide proper recharging of the battery.

To satisfy the above, most "line" and battery operated portable television receivers have two regulators, one for use during the television operating mode and the other for use during battery charging. In accordance with the invention, a single voltage regulator is automatically reset to regulate at a different potential dependent upon whether the television receiver is in the operating mode or in the battery charging mode. Further, in accordance with the invention, a transformer for developing operating power from an external power source is provided which has a preselected voltage-current characteristic such that under charging conditions the transformer terminal voltage is substantially higher than it is under television operating conditions.

Accordingly, a principal object of this invention is to provide an electronic apparatus incorporating novel regulator circuitry for operation with either an external or internal power source.

Another object of this invention is to provide a voltage regulator for electronic apparatus which may conveniently and automatically be reset to regulate for different voltages.

A further object of this invention is to provide a single voltage regulator and transformer in a portable television receiver having a rechargeable battery, where the receiver is operable at a first regulated voltage and the battery is rechargeable at a second regulated voltage.

A still further object of this invention is to provide a novel, dual purpose voltage regulator for a portable television receiver in combination with a power supply transformer having a preselected voltage-current characteristic.

Other objects of this invention will become apparent upon reading the following specification in conjunction with the drawing in which:

FIG. 1 is a partial schematic diagram of a portable television receiver power supply incorporating the invention; and FIG. 2 indicates diagrammatically alternate plug-in arrangements for use with external sources of power.

Briefly in accordance with the invention, an electronic apparatus (in the described embodiment a television receiver), requiring DC power at a first voltage, incorporates a self-contained rechargeable battery, voltage regulator means for maintaining this first voltage, and an auxiliary power supply including a transformer for connection to an external source. There is also provision for disconnecting the battery from the input of the regulator means when the transformer is connected to an external source whereby the auxiliary power supply also can provide power for the apparatus through the regulator means. Further, a charging circuit interconnects the output of the regulator means and the battery for recharging the battery through the regulator means form the external source when the apparatus is off.

Referring now to FIG. 1, there is shown a rechargeable battery 10 having its positive terminal connected through a pair of normally-open, serially connected, switches 11 and 13 to the input of a voltage regulator. The negative terminal of battery 10 is connected to ground through another switch 12, which, as is indicated by the dashed line joining the components, is ganged with switch 11, both switches being operable as a single unit.

The voltage regulator comprises regulator transistor 30, control transistor 35, Zener diode 40, and a voltage divider arrangement for sensing a representative portion of the output voltage. Regulator transistor 30 has its emitter 31 connected to the positive terminal of battery 10 through the aforementioned switches 11 and 13. Its collector 33 is connected to one terminal of Zener diode 40 and to a block 50 which is labeled TV LOAD. A starting resistor 34 interconnects emitter 31 and collector 33. Base 32 of transistor 30 is connected, through a resistor 28, to collector 38 of control transistor 35. Emitter 36 of transistor 35 is connected to the other terminal of Zener diode 40 and base 37 is connected to ground through a resistor 39.

A voltage divider comprising resistor 42, variable resistor 43, and resistor 44 is connected between the collector of regulator transistor 30 and the negative terminal of battery 10. The junction of resistor 44 and variable resistor 43 is directly connected to the base of control transistor 35 and is used to apply base potential thereto as a direct function of the output voltage. The junction of Zener diode 40 and emitter 36 is connected to a resistor 41, which is also returned to the negative side of battery 10.

With the circuit thus described and with all switches closed, battery 10 supplies current through the emitter-collector circuit of regulator transistor 30 to the TV LOAD. Starter resistor 34 has a relatively high resistance in comparison with the conductive resistance of emitter 31 and collector 33. Resistor 34 therefore initially bypasses current around the regulator transistor to insure operational potentials being applied to the control transistor.

Zener diode 40, as is well known to those skilled in the art, has a so-called "Zener potential" which it maintains across its terminals over a large current range. For example, in an actual embodiment of the invention, battery 10 was nominally rated at twelve volts and Zener diode 40 was nominally rated at nine volts. To carry the example into this circuit discussion, there would be substantially a nine-volt drop across Zener diode 40 and a three-volt drop across resistor 41 since they are connected in series across the output. The three-volt potential is applied to emitter 36 of control transistor 35. The voltage divider comprising resistor 42, variable resistor 43, and resistor 44 also supplies a potential to base 37 of the control transistor. Variable resistor 43 is set at the factory to insure a given voltage at the TV LOAD for a given set of production components.

In effect, the base-emitter potential of control transistor 35 which is a function of the absolute change (in output voltage) controls its degree of conduction and establishes the base-emitter potential for regulator transistor 30. Thus, conduction in regulator transistor 30 is controlled by its output voltage. Fluctuations in the voltage output give rise to immediate changes in the base-emitter potentials of transistor 35 and corrective action occurs in accordance with well known principles.

It should be noted that the regulator per se is believed well known and intricate details of its operation are purposely being avoided. Suffice it to say that the potential across resistor 44 will be determinative of the voltage output that the regulator will tend to maintain. To reset the regulator to maintain a higher terminal voltage, the potential across resistor 44 should be increased. This may be done by reducing the setting of variable resistor 43.

An auxiliary power supply is provided which comprises a transformer 20 having a primary winding 21 and a secondary winding 22. The secondary winding of transformer 20 is center tapped; its center tap being returned to the negative terminal of battery 10 and the outer ends of winding 22 connected to a pair of similarly poled diodes 23 and 24. The diodes are connected together at their remaining terminals and feed a filter capacitor 25. The arrangement will be recognized as a conventional full wave rectifier. Primary winding 21 connects to terminals 18 and 19 on a socket 15. Socket 15 also has a pair of terminals 16 and 17 which are connected in parallel with the output of the auxiliary power supply. Socket 15 also includes a mechanical interlock element 14 which opens switch 13 whenever a mating plug is inserted into socket 15.

In FIG. 2 there is shown two alternate plug arrangements which may be utilized with socket 15. It should be understood, of course, that this separate showing is for purposes of clarity only and that a single arrangement may be readily envisioned wherein a switch is utilized rather than two separate plugs. Plug 51, for example is utilized where the receiver is to be operated from an outside 12-volt supply such as that available at the cigar lighter of an automobile. An adapter plug 55 is shown for connecting the 12-volt supply of the automobile to a pair of pins 52 and 53 which are adapted for mating engagement with terminals 16 and 17, respectively, of socket 15. A center pin 54 is used to activate interlock 14 when the plug is inserted. Plug 61 is useful when the television set is to be operated from an external 117-volt, 60-cycle source. For this purpose a conventional duplex connector plug 65 is provided. The duplex plug is connected to a pair of pins 62 and 63, adapted for mating engagement with terminals 18 and 19, respectively, when plug 61 is inserted in socket 15. Here again a center pin 64 is provided to activate interlock member 14.

Thus, whenever an external source of supply is used, it will be seen that switch 13 is open, thereby precluding connection of battery 10 to TV LOAD 50. Further, depending upon which plug is used, either the direct battery supply connections (16 and 17) or the A.C. line connections (18 and 19) will be brought into circuit relationship with the regulator. The direct battery connections are quite simple and merely parallel the output of the auxiliary power supply. The external battery is therefore connected across the voltage regulator input, and the input voltage to the TV LOAD is therefore regulated in the normal manner.

Similarly when transformer 20 is energized, the output of secondary winding 22 is rectified by diodes 23 and 24, filtered by capacitor 25, and impressed upon the input of the voltage regulator to again provide a regulated source of power for TV LOAD 50. Both examples have, of course, referred to the operating mode of the television receiver (when switches 11 and 12 are closed).

Turning now to the voltage divider, it will be seen that, when switch 12 is closed, the negative terminal of battery 10 is connected to ground. Under this condition, resistor 44 of the voltage divider is connected in parallel with resistor 39 which is connected between ground and base 37 of control transistor 35. Consequently, the effective resistance in this portion of the voltage divider is decreased in accordance with the well known law concerning parallel resistances. Thus, a smaller reference potential is applied to base 37 of control transistor 35 with a consequent decrease in conductivity along the base-emitter path thereof. The net effect is to decrease the emitter-collector conductivity of regulator transistor 30 which produces a lower regulated input voltage to TV LOAD 50. For example, with the television operating, the input voltage thereto will be regulated at approximately 12 volts. (This value is determined by the previously discussed adjustment of variable resistance 43.)

Assume now that transformer 20 is still energized and that the TV LOAD is switched off (by opening switches 11 and 12). It will be seen that the ground connection is opened and the TV load is therefore disconnected. Under this condition, resistors 39 and 44 are no longer connected in parallel and resistor 44 alone comprises the third resistance in the voltage divider. Consequently, a larger portion of the output across the voltage divider is applied to the base of the control transistor (the drop across resistor 41 will be initially assumed to remain constant) with the result that a greater degree of conduction occurs in control transistor 35. The end result is that the emitter-collector impedance of regulator transistor 30 is reduced, and the regulator allows a greater output potential at its output terminals. Of course, as the output voltage increases the drop across resistor 41 increases (as well as the drop across resistor 44, though not as much), and a new regulation point is attained.

Simultaneously, there is a decreased load on transformer 20 since the current requirement for battery charging is substantially less than the current requirement for TV operation. Transformer 20 is selected to have a poor regulation characteristic or, in other words, to have a voltage-current characteristic which produces a substantially higher terminal potential when supplying battery charging current than is produced when supplying the greater TV load currents. In practice, the rectified output of transformer 20, when operated in the battery charging mode, will be in excess of 17 volts, and the regulator will regulate the charging current to battery 10 at 17 volts.

The charging circuit to the battery comprises a diode 45 connected in series with a resistor 46 between the output of the regulator and the positive terminal of battery 10. Diode 45 is poled to allow current flow only in the charging direction for battery 10. Normally the charging circuit is ineffective unless a difference of potential in excess of the diode potential drop exists between the regulator and the battery terminal voltage. In a rare situation (where the terminal voltage of battery 10 has deteriorated drastically) slight charging may occur during normal TV operation since approximately 12 volts is maintained at the output of the regulator. However, in general battery 10 will not be charged when the TV load is connected.

What has been described is a novel, dual purpose voltage regulator for an electronic apparatus having a self-contained and auxiliary supply. In accordance with the description, the regulator selectivity regulates at two different potentials depending upon whether the apparatus is in the normal operational mode or in the charging mode. Further the transformer used in the auxiliary supply is selected to have a predetermined regulation characteristic whereby its terminal potential rises substantially when supplying charging current to provide the necessary higher charging potential. It is recognized that numerous modifications and alterations of the circuit described will be readily apparent to those skilled in the art without departing from the true scope and spirit of the invention as described in the claims.

The embodiments of the invention in which an exclusive property or privilege is claimed are defined as follows:

1. An electronic apparatus requiring DC power at a first voltage comprising: a self-contained rechargeable battery; voltage regulating means having an input connectable to said battery for maintaining said first voltage; an auxiliary power supply including a transformer adapted for connection to an external AC source; means disconnecting said battery from the input of said voltage regulating means upon connection of said transformer to said external source, whereby said auxiliary power supply supplies said apparatus through said regulating means; a charging circuit interconnecting the output of said regulating means and said battery; and means, operable responsive to turn-off of said apparatus for recharging said rechargeable battery from said external source through said regulating means.

2. An electronic apparatus as set forth in claim 1 wherein said regulating means includes a transistor and a voltage sensing resistor; and means changing the value of said resistor responsive to turn-off of said apparatus whereby a higher voltage is available for recharging said battery.

3. An electronic apparatus requiring DC power at a first voltage and current comprising: a self-contained rechargeable battery; voltage regulating means having an input connectable to said battery for maintaining said first voltage; an auxiliary power supply including a transformer adapted for connection to an external AC source; means disconnecting said battery from the input of said regulating means upon connection of said transformer to said external source, whereby said auxiliary power supply supplies said apparatus through said regulating means; a charging circuit interconnecting the output of said regulating means and said battery; means, operable responsive to turn-off of said apparatus for recharging said rechargeable battery from said external source through said regulating means at a second voltage and current, said last mentioned means including means resetting said regulating means to maintain said second voltage at its output; said transformer having a voltage-current characteristic selected to automatically produce said first and said second voltages upon delivering said first and said second currents, respectively.

4. In an electronic apparatus, including a load circuit requiring DC power at a given voltage; a self-contained power supply including a rechargeable battery; voltage regulating means interposed between said battery and said load circuit for maintaining said given voltage across said load circuit; first switch means connecting said battery to said regulating means; a network for converting alternating current into direct current connected across the input of said regulating means; said network including a transformer adapted for connection to an external source; second switch means disconnecting said battery from said regulating means upon connection of said transformer to an external source whereby said network supplies said load circuit through said regulating means; and means, including said network and a unilateral conducting device, operable responsive to both said switches being in a non-conductive condition, for recharging said rechargeable battery from said external source through said regulating means.

5. In an electronic apparatus as set forth in claim 4 wherein said regulating means comprises a pair of transistors, one of said transistors having an input resistor in voltage sensing relationship to the output of the regulating means.

6. In an electronic apparatus as set forth in claim 5 wherein said second switch means effectively connects another resistor in parallel with said input resistor whereby the voltage at the input of said one transistor is changed and said regulating means is reset to maintain a different output voltage.

7. In an electronic apparatus as set forth in claim 6 wherein said transformer is selected to have a predetermined voltage-current characteristic corresponding to the voltage-current requirements of the apparatus under normal and recharging conditions, whereby said transformer develops a substantially higher output potential under recharging conditions.

8. In a television receiver having a rechargeable battery supply, said receiver requiring a first voltage and current during operation and said battery requiring a second voltage and current during recharging; a voltage regulator having an input and an output; an auxiliary power supply including a transformer and diode rectifier; means, including first switch means, selectively connecting said regulator input to said battery and said auxiliary power supply; said regulator having a transistor input circuit responsive to the output of said regulator, said transformer having a current-voltage characteristic selected to produce said first voltage when delivering said first current and said second voltage when delivering said second current; second switch means disabling said battery supply upon connection of said transformer to an external source, whereby said transformer and diode rectifier supply said receiver with said first voltage and current through said regulator; and a charging circuit from said regulator output to said battery, said transformer and diode rectifier supplying said second voltage and current to said battery when said television receiver is off.

References Cited

UNITED STATES PATENTS

| | | | |
|---|---|---|---|
| 3,308,306 | 3/1967 | Bagno | 307—66 |
| 3,322,964 | 5/1967 | Walter et al. | 307—66 |
| 3,339,080 | 8/1967 | Howald | 307—66 |

ROBERT K. SCHAEFER, *Primary Examiner.*

H. J. HOHAUSER, *Assistant Examiner.*

U.S. Cl. X.R.

320—2; 323—16